United States Patent
Kong et al.

(10) Patent No.: US 7,209,125 B2
(45) Date of Patent: *Apr. 24, 2007

(54) METHOD FOR DRIVING A TOUCH PANEL DEVICE

(75) Inventors: Nam Yong Kong, Kyonggi-do (KR); Cheon Suck Lee, Kyonggi-do (KR)

(73) Assignee: LG.Philips LCD Co., Ltd., Seoul (KR)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 512 days.

(21) Appl. No.: 10/740,504

(22) Filed: Dec. 22, 2003

(65) Prior Publication Data

US 2004/0130537 A1   Jul. 8, 2004

(30) Foreign Application Priority Data

Dec. 23, 2002   (KR) ................. P 10-2002-0082522

(51) Int. Cl.
*G09G 5/00* (2006.01)
*G06K 11/06* (2006.01)
*G06F 3/033* (2006.01)

(52) U.S. Cl. ................ 345/173; 178/18.01; 178/19.01; 178/20.01

(58) Field of Classification Search ........ 345/173–179; 178/18.01, 18.02, 18.03, 18.1, 19.01, 19.03, 178/19.04, 20.01

See application file for complete search history.

(56) References Cited

U.S. PATENT DOCUMENTS

| | | | | | |
|---|---|---|---|---|---|
| 5,229,551 | A | * | 7/1993 | McDermott et al. | 178/18.02 |
| 5,373,117 | A | * | 12/1994 | Crooks | 178/18.02 |
| 5,861,874 | A | * | 1/1999 | Joto | 345/173 |
| 6,005,200 | A | * | 12/1999 | Stanchak et al. | 178/19.01 |
| 2003/0063073 | A1 | * | 4/2003 | Geaghan et al. | 345/173 |

FOREIGN PATENT DOCUMENTS

| | | |
|---|---|---|
| EP | 0 816 992 | 1/1998 |
| JP | 11-65770 | 3/1999 |

* cited by examiner

*Primary Examiner*—Henry N. Tran
(74) *Attorney, Agent, or Firm*—McKenna Long & Aldridge LLP (57) ABSTRACT

A method for driving a touch panel that detects and compensates a double touch includes sequentially inputting coordinate values of touched points on the touch panel at predetermined time intervals, measuring a variation of the inputted coordinate values, determining the inputted coordinate values as a double touch when the measured variation is greater than a predetermined value, and compensating the inputted coordinate values if determined as a double touch.

11 Claims, 6 Drawing Sheets

METHOD FOR DRIVING A TOUCH PANEL DEVICE

The present invention claims the benefit of Korean Patent Application No. P2002-82522 filed in Korea on Dec. 23, 2002, which is hereby incorporated by reference.

BACKGROUND OF THE INVENTION

1. Field of the Invention

The present invention relates to a method for driving a touch panel device, and more particularly, to a method for driving a touch panel device that detects a double touch and prevents a detection error caused by a double touch by a stylus or a user's finger.

2. Description of the Related Art

In general, touch panel devices are considered computer peripherals that are installed on a display surface of display devices, such as cathode ray tube (CRT) devices, liquid crystal display (LCD) devices, field emission display (FED) devices, plasma display panel (PDP) devices, and electroluminescence display (ELD) devices to eliminate uses of other input devices. By integrating touch panels with display devices, it is possible for a user to select desired information while watching an image displayed by the display device. For example, the user selects desired information by touching and applying pressure onto the touch panel where the information is displayed, and the touch panel detects a coordinate of such touch to determine the user's selection.

Touch panels may be classified based on the detection mechanism used therein. For example, there are analog resistive type, capacitive type, electromagnetic (EM) type, saw type and infrared type of touch panels. In particular, a capacitive type touch panel typically includes upper and lower transparent substrates bonded to each other with a predetermined space therebetween. Each of the upper and lower transparent substrates includes upper and lower electrodes formed thereon. Accordingly, if the surface of the upper transparent substrate is touched by an input means, such as a stylus or a user's finger, the upper electrode on the upper transparent substrate then electrically connects to the lower electrode formed on the lower transparent substrate. As a result, a variation in a voltage caused by a resistance change or a capacitance change at the touched point can be detected.

In addition, when the capacitive type touch panel is installed on an LCD device, a film having a transparent electrode typically is formed on the LCD panel with a voltage applied to each corner of the film, thereby generating an uniform electric field in the transparent electrode. Thus, when the surface of the LCD touch panel is touched by an input means, a voltage drop can be generated to additionally detect coordinates of the touched point.

Figure 1:
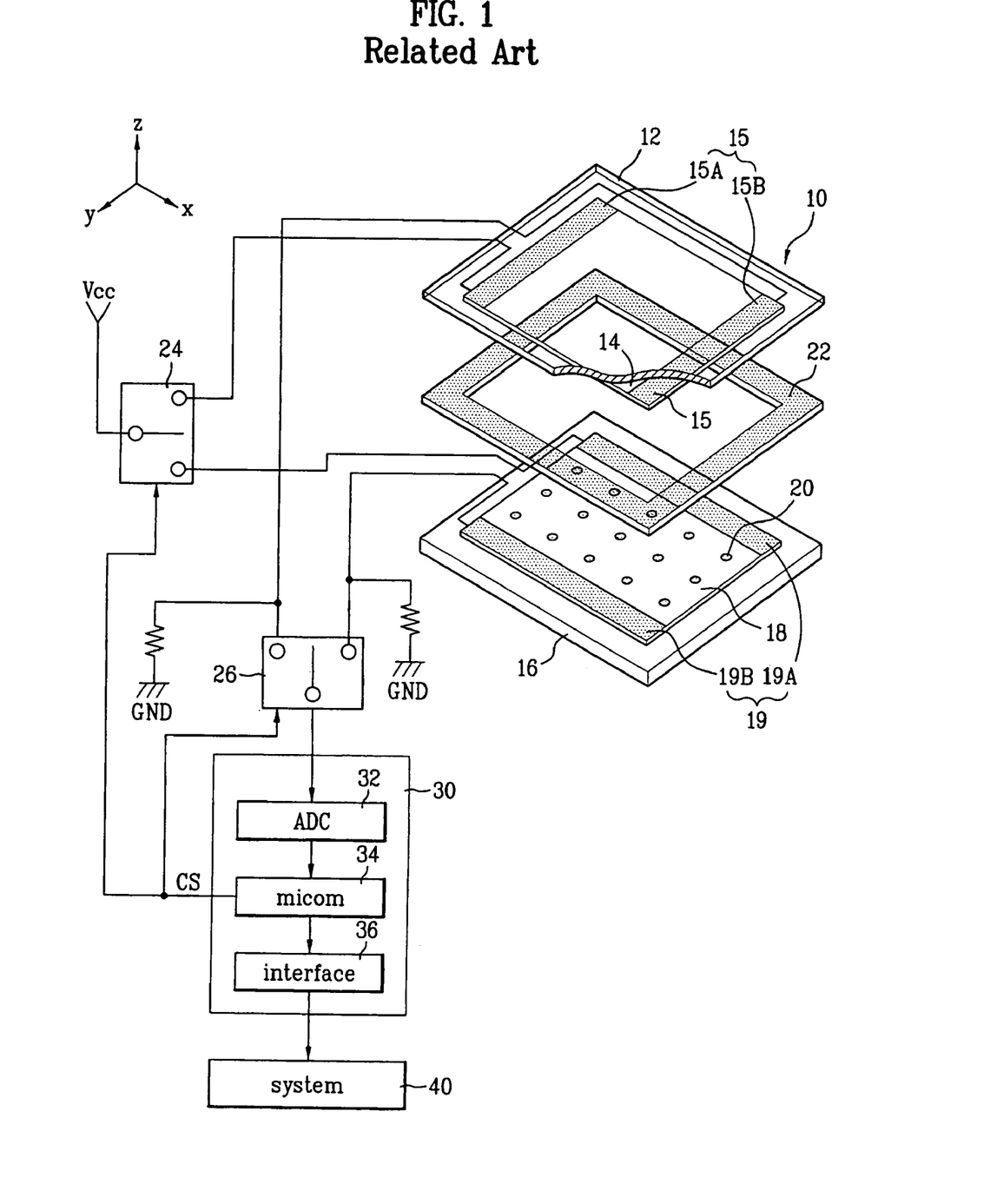
FIG. 1 is a schematic view of a method for driving a resistive type touch panel device according to the related art.

FIG. 1 illustrates a schematic view of a method for driving a resistive type touch panel device according to the related art. In FIG. 1, the touch panel device includes a touch panel 10, a touch panel controller 30, and a system 40. In particular, the touch panel controller 30 drives the touch panel 10, detects a coordinate signal outputted from the touch panel 10, measures coordinates according to the outputted coordinate signal, and then outputs the measured value of the coordinates to the system 40. The system 40 then performs a command corresponding to the measured value of the coordinates.

In addition, the touch panel 10 includes an upper film 12 and a lower film 16 facing each other with a predetermined space therebetween. A first transparent conductive layer 14 is formed on a lower surface of the upper film 12, and a second transparent conductive layer 18 is formed on an upper surface of the lower film 16. The upper film 12 and the lower film 16 are bonded to each other in the circumference of a non-touch area thereof by an adhesive 22. Thus, the predetermined space between the upper and lower films 12 and 16 corresponds to a thickness of the adhesive 22. A plurality of dot spacers 20 are additionally formed in a touch area on the first transparent conductive layer 14 of the upper film 12 or the second transparent conductive layer 18 of the lower film 16 to maintain the predetermined space between the upper and lower films 12 and 16.

In general, the upper film 12 is formed of a transparent film such as a Polyethylene Terephtalate (PET) film, and the lower film 16 is formed of a transparent film, a glass substrate or a plastic substrate of the same material as the upper film 12. The first and second transparent conductive layers 14 and 18 are formed of one of Indium-Tin-Oxide (ITO), Indium-Zinc-Oxide (IZO) and Indium-Tin-Zinc-Oxide (ITZO).

Further, the touch panel 10 includes an X-electrode bar 15 and a Y-electrode bar 19. The X-electrode bar 15 includes two side bars, first and second X-electrode bars 15A and 15B, contacting two sides of the first transparent conductive layer along an X-axis direction, respectively, and applying a voltage to the first transparent conductive layer 14 along the X-axis direction. The first X-electrode bar 15A applies a driving voltage Vcc to form a current in the first transparent conductive layer 14 along the X-axis direction, and the second X-electrode bar 15B applies a ground voltage GND. The Y-electrode bar 19 also includes two side bars, first and second Y-electrode bars 19A and 19B, contacting two sides of the second transparent conductive layer 18 along a Y-axis direction, respectively, and applying a voltage to the second transparent conductive layer 18 along the Y-axis direction. The first Y-electrode 19A applies a driving voltage Vcc to form a current in the second transparent conductive layer 18 along the Y-axis direction, and the second Y-electrode bar 19B applies a ground voltage GND.

When a user touches the upper film 12 of the touch panel 10 with an input means, the first transparent conductive layer 14 then contacts the second transparent conductive layer 18, such that a resistance value varies at the touched point. Subsequently, the current or the voltage varies according to the varied resistance value, so that an X-axis coordinate signal is outputted through the second Y-electrode bar 19B, and a Y-axis coordinate signal is outputted through the second X-electrode bar 15B.

In particular, the touch panel 10 sequentially outputs the X-axis and Y-axis coordinate signals based on a control signal from the touch panel controller 30. The controller 30 selectively provides the driving voltage Vcc and the ground voltage GND to the first and second X-electrode bars 15A and 15B through a first switch 24 and a second switch 26, respectively, thereby controlling the touch panel 10 to output the X-axis coordinate signal through the second Y-electrode bar 19B. Subsequently, the touch panel controller selectively provides the driving voltage Vcc and the ground voltage GND to the first and second Y-electrode bars 19A and 19B through the first and second switches 24 and 26, respectively, thereby controlling the touch panel 10 to output the Y-axis coordinate signal through the second X-electrode bar 15B. The first switch 24 selectively provides the driving voltage Vcc to the first X-electrode bar 15A or the first Y-electrode bar 19A in response to a control signal CS outputted from the touch panel controller 30. Also, in response to the control signal, the second switch 26 selectively provides the ground voltage GND to the second X-electrode bar 15B or the second Y-electrode bar 19B or selectively outputs the voltage of the touched point from the touch panel to the touch panel controller 30.

The touch panel controller 30 includes an analog-digital converter (ADC) 32, a micom 34 and an interface 36. When the touch panel controller 30 receives the X-axis and Y-axis coordinate signals from the touch panel 10, the ADC 32 sequentially converts the X-axis and Y-axis coordinate signals to digital data. The micom 34 then detects the coordinate value by combining the X-axis and Y-axis coordinate data, and the interface 36 relays the coordinate value to the system 40. In addition, the micom 34 periodically generates the control signal CS.

The system 40 detects the coordinate value from the touch panel controller 30, and performs a command or an applied program corresponding to the coordinate value. Also, the system 40 provides a power source signal and a video data signal for a display (not shown) formed on a surface of the touch panel 10. Thus, the touch panel device detects the coordinate value touched by the pen or the user's finger, and then transmits the coordinate value to the system 40, such that the system 40 performs a command corresponding to the coordinate value.

Figure 2:
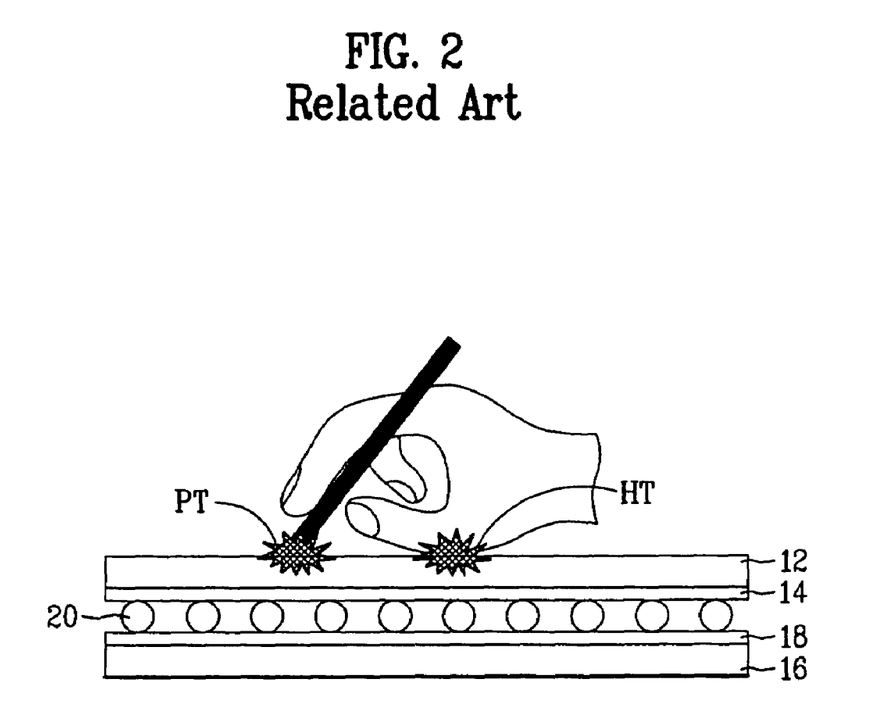
FIG. 2 is a cross-sectional view of a double touch on a touch panel device.

FIG. 2 illustrates a cross-sectional view of a double touch on a touch panel. In FIG. 2, a double touch occurs when the upper film 12 unintentionally is touched with a pen and a user's hand at the same time or within a short time interval. When the pen and the user's hand touch the touch panel 10 at the same time, the touch panel 10 generates a coordinate signal corresponding to a middle point between the pen touch point PT and the hand touch point HT, instead of the pen touch point PT. Subsequently, the touch panel controller 30 and the system detect and process the coordinate signal for the middle point erroneously as the user's desired input.

Alternatively, when the user's hand unintentionally touches the upper film 12 shortly after the pen touching the upper film 12, the touch panel 10 generates a first coordinate signal for the pen touch point Pt, and then a second coordinate signal for a middle point between the pen touch point PT and the hand touch point HT. If both the first and second coordinate signals are generated within a unit time period, e.g., 3.4 ms, the touch panel controller detects the second coordinate signal as the user's desired input, because the touch panel 10 sequentially outputs the coordinate signals and the second coordinate signal is a later signal inputted to the touch panel controller 30. Thus, the touch panel controller 30 and the system erroneously process the coordinate signal for the middle point as the user's desired input. Thus, the performance of the related art method for driving touch panel has not been fully satisfactory.

SUMMARY OF THE INVENTION

Accordingly, the present invention is directed to an apparatus and a method for driving a touch panel that substantially obviates one or more of the problems due to limitations and disadvantages of the related art An object of the present invention is to provide a method for driving a touch panel that detects and compensates a double touch rapidly and accurately, thereby preventing an error in detecting coordinates for touched points on the touch panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for driving a touch panel includes sequentially inputting coordinate values of touched points on the touch panel at predetermined time intervals, measuring a variation of the inputted coordinate values, determining the inputted coordinate values as a double touch when the measured variation is greater than a predetermined value, and compensating the inputted coordinate values if determined as a double touch.

In another aspect, the method for driving a touch panel includes sequentially inputting coordinate values corresponding to at least two portions touched on the touch panel at predetermined time intervals, measuring a variation of the inputted coordinate values, determining the inputted coordinate values as a double touch if the measured variation is greater than a predetermined value, and compensating the inputted coordinate values based on whether they are determined as a double touch.

In another aspect, the method for driving a touch panel includes sequentially inputting coordinate values corresponding to at least two portions touched on the touch panel at predetermined time intervals, measuring a variation of the inputted coordinate values, detecting whether the measured variation is greater than a predetermined value, detecting whether the coordinate values were compensated previously, compensating the inputted coordinate values when the measured variation is detected to be greater than the predetermined value, and when the coordinate values were not compensated previously, compensating the inputted coordinate values when the measured variation is detected not to be greater than the predetermined value, and when the coordinate values were compensated previously, recognizing the inputted coordinate values as substantial coordinate values when the measured variation is detected to be greater than the predetermined value, and when the coordinate values were compensated previously, and recognizing the inputted coordinate values as the substantial coordinate values when the measured variation is detected to be less than the predetermined value, and when the coordinate values were not compensated previously.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 3:
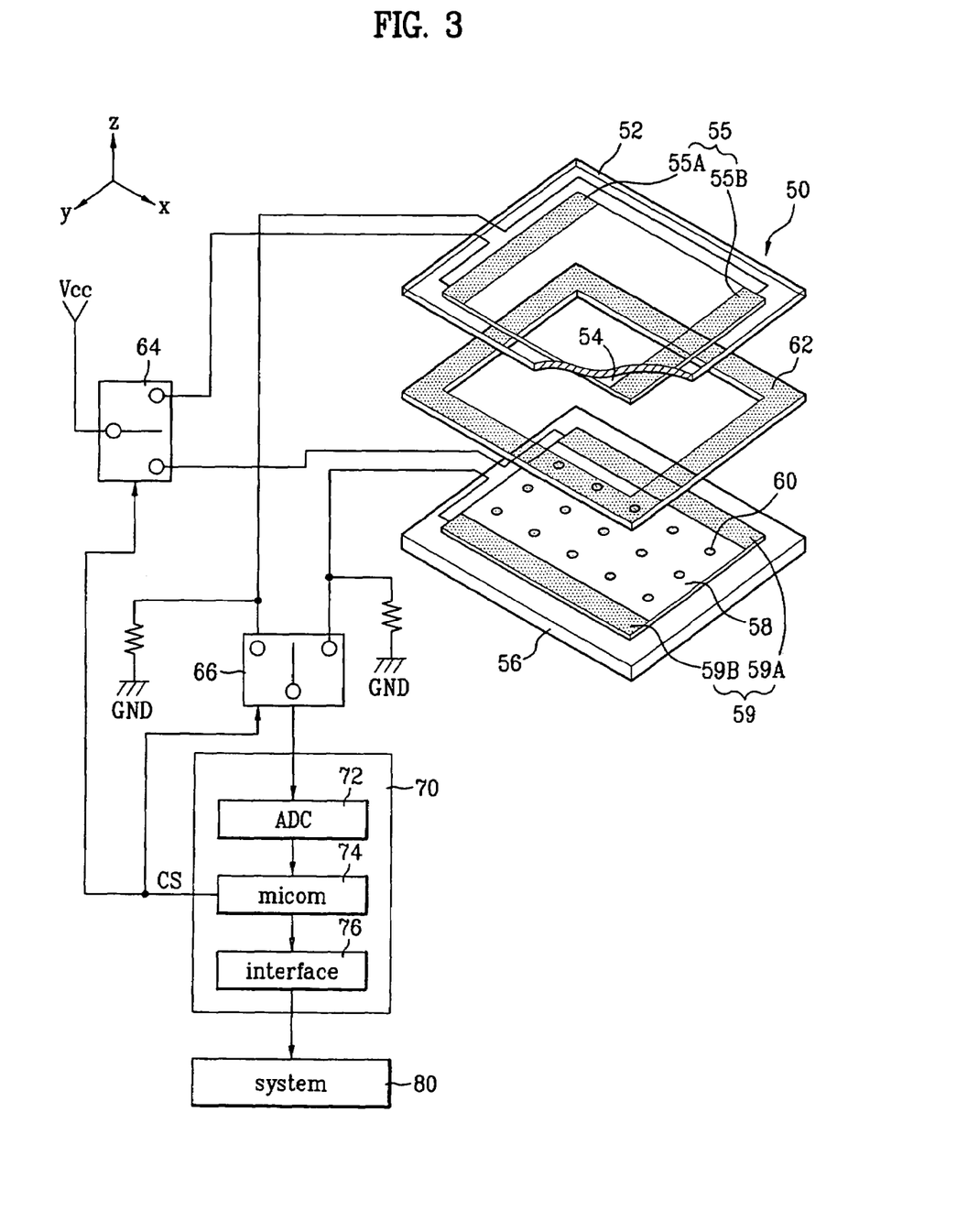
FIG. 3 is a schematic view illustrating a touch panel device according to the present invention.

FIG. 3 is a schematic view illustrating a touch panel according to the present invention. In FIG. 3, the touch panel device may include a touch panel 50, a touch panel controller 70, and a system 80. In particular, the touch panel controller 70 may drive the touch panel 50, may detect a coordinate signal outputted from the touch panel 50, may measure coordinates according to the outputted coordinate signal, and then may output the measured value of the coordinates to the system 80. The system 80 then may perform a command corresponding to the measured value of the coordinates.

In addition, the touch panel 50 may include an upper film 52 and a lower film 56 facing each other with a predetermined space therebetween. A first transparent conductive layer 54 may be formed on a lower surface of the upper film 52, and a second transparent conductive layer 58 may be formed on an upper surface of the lower film 56. The upper film 52 and the lower film 56 may be bonded to each other in the circumference of a non-touch area thereof by an adhesive 62. Thus, the predetermined space between the upper and lower films 52 and 56 may correspond to a thickness of the adhesive 22. A plurality of dot spacers 60 may be additionally formed in a touch area on the first transparent conductive layer 54 of the upper film 52 or the second transparent conductive layer 58 of the lower film 56 to maintain the predetermined space between the upper and lower films 52 and 56.

In general, the upper film 52 may be formed of a transparent film such as a Polyethylene Terephtalate (PET) film, and the lower film 56 may be formed of a transparent film, a glass substrate or a plastic substrate of the same material as the upper film 52. The first and second transparent conductive layers 54 and 58 may be formed of one of Indium-Tin-Oxide (ITO), Indium-Zinc-Oxide (IZO) and Indium-Tin-Zinc-Oxide (ITZO).

Further, the touch panel 50 may include an X-electrode bar 55 and a Y-electrode bar 59. The X-electrode bar 55 may include two side bars, first and second X-electrode bars 55A and 55B, contacting two sides of the first transparent conductive layer along an X-axis direction, respectively, and applying a voltage to the first transparent conductive layer 54 along the X-axis direction. The first X-electrode bar 55A may apply a driving voltage Vcc to form a current in the first transparent conductive layer 54 along the X-axis direction, and the second X-electrode bar 55B may apply a ground voltage GND. The Y-electrode bar 59 also may include two side bars, first and second Y-electrode bars 59A and 59B, contacting two sides of the second transparent conductive layer 58 along a Y-axis direction, respectively, and applying a voltage to the second transparent conductive layer 58 along the Y-axis direction. The first Y-electrode 59A may apply a driving voltage Vcc to form a current in the second transparent conductive layer 58 along the Y-axis direction, and the second Y-electrode bar 59B may apply a ground voltage GND.

When a user touches the upper film 52 of the touch panel 50 with an input means, the first transparent conductive layer 54 then may contact the second transparent conductive layer 58, such that a resistance value varies at the touched point. Subsequently, the current or the voltage may vary according to the varied resistance value, so that an X-axis coordinate signal may be outputted through the second Y-electrode bar 59B, and a Y-axis coordinate signal may be outputted through the second X-electrode bar 55B.

In particular, the touch panel 50 may sequentially output the X-axis and Y-axis coordinate signals based on a control signal from the touch panel controller 70. The controller 70 may selectively provide the driving voltage Vcc and the ground voltage GND to the first and second X-electrode bars 55A and 55B through a first switch 64 and a second switch 66, respectively, thereby controlling the touch panel 50 to output the X-axis coordinate signal through the second Y-electrode bar 59B. Subsequently, the touch panel controller 70 may selectively provide the driving voltage Vcc and the ground voltage GND to the first and second Y-electrode bars 59A and 59B through the first and second switches 64 and 66, respectively, thereby controlling the touch panel 50 to output the Y-axis coordinate signal through the second X-electrode bar 55B. The first switch 64 may selectively provide the driving voltage Vcc to the first X-electrode bar 55A or the first Y-electrode bar 59A in response to a control signal CS outputted from the touch panel controller 70. Also, in response to the control signal, the second switch 66 may selectively provide the ground voltage GND to the second X-electrode bar 55B or the second Y-electrode bar 59B or selectively output the voltage of the touched point from the touch panel to the touch panel controller 70.

The touch panel controller 70 may include an analog-digital converter (ADC) 72, a micom 74 and an interface 76. When the touch panel controller 70 receives the X-axis and Y-axis coordinate signals from the touch panel 50, the ADC 72 may sequentially convert the X-axis and Y-axis coordinate signals to digital data. The micom 74 then may detect the coordinate value by combining the X-axis and Y-axis coordinate data, and the interface 76 may relay the coordinate value to the system 80. In addition, the micom 74 may periodically generate the control signal CS. Further, when a double touch occurs, e.g., when a pen and a user's hand touch the touch panel at the same time, the micom 74 may prevent the error of the double touch and may compensate the coordinate value using a software system.

The system 80 may detect the coordinate value from the touch panel controller 70, and may perform a command or an applied program corresponding to the coordinate value. Also, the system 80 may provide a power source signal and a video data signal for a display (not shown) formed on a surface of the touch panel 50. Thus, the touch panel device may detect the coordinate value touched by the stylus or the user's finger, and then may transmit the coordinate value to the system 80, such that the system 80 may perform a command corresponding to the coordinate value. Further, when a double touch occurs, the system 80 alternatively may prevent the error of the double touch and may compensate the coordinate value using a software system.

Figure 4:
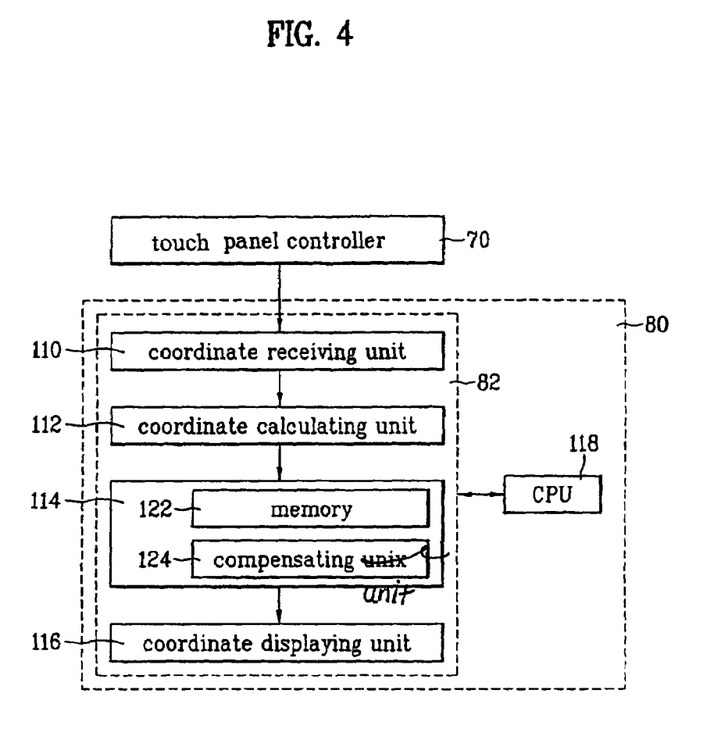
FIG. 4 is a block diagram illustrating a system of FIG. 3.

FIG. 4 is a block diagram illustrating a system of FIG. 3. In FIG. 4, the system 80 may compensate a false coordinate value caused by a double touch and transmitted from the touch panel controller 70. The system 80 may include a central processing unit (CPU) 118, and a touch panel driver 82 for compensating the false coordinate value, e.g., a middle point of the two touched points caused by the double touch. In particular, the touch panel driver 82 may include a coordinate receiving unit 110, a coordinate calculating unit 112, a hand-rejection processing unit 114, and a coordinate displaying unit 116.

The coordinate receiving unit 110 may receive the digital coordinate value from the touch panel controller 70. The coordinate calculating unit 112 may reset the digital coordinate value based on a Communication Protocol of the display resolution, e.g., XGA or SVGA, and then may provide the reset digital coordinate value to the hand-rejection processing unit 114. In addition, the hand-rejection processing unit 114 may calculate a variation of the reset coordinate value.

The hand-rejection processing unit 114 may include a memory 122 and a compensating unit 124. In particular, the memory 122 may store the reset coordinate value received from the coordinate calculating unit 112, and may store coordinate values sequentially detected by the touch panel controller 70. The compensating unit 124 may calculate a variation of the coordinate value with the coordinate value stored in the memory 122 and a new coordinate value received from the coordinate calculating unit 112. If the variation is greater than a predetermined value, the coordinate value then may be determined as a double touch. In addition, the hand-rejection processing unit 114 may generate a correct coordinate value by compensating the reset digital coordinate value. Accordingly, the hand-rejection processing unit 114 may compensate the false coordinate value caused by the double touch with the CPU 118 having a rapid processing time. Also, the coordinate display unit 116 may display the correct coordinate value compensated by the hand-rejection processing unit 114 on the display.

Figure 5:
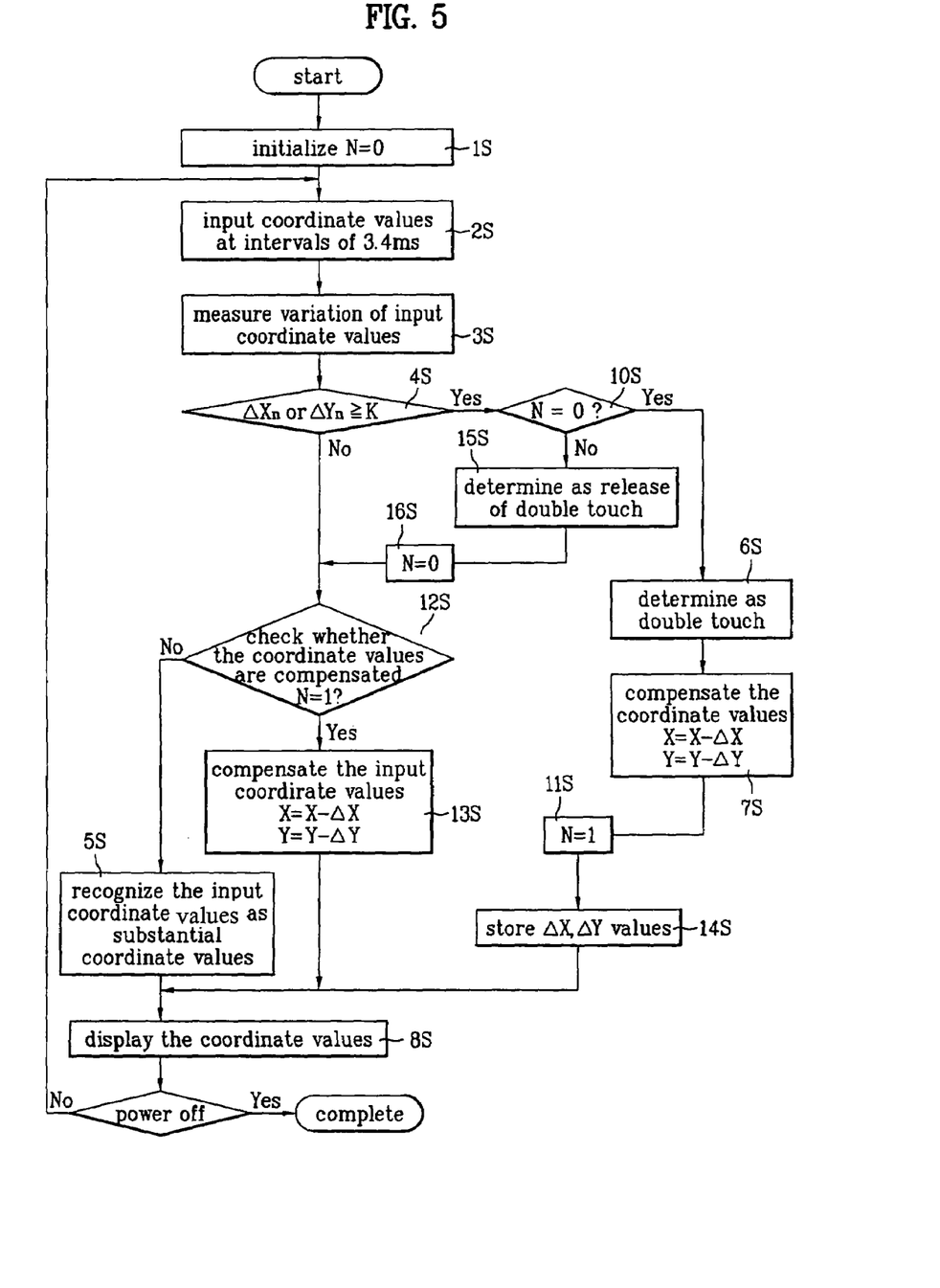
FIG. 5 is a flow diagram of an exemplary method for driving a touch panel device according to the present invention.

FIG. 5 is a flow diagram of an exemplary method for driving a touch panel device according to the present invention. In particular, the micom 74 of the touch panel controller 70 may control the first and second switches 64 and 66 at predetermined time intervals set to a unit time period of 3.4 ms. In FIG. 5, at step 1S of an initialized state (N=0), the X-Y coordinate value may be converted to a digital value using the ADC 72. At step 2S, the digital coordinate value may be inputted to the system 80 at the predetermined intervals. In particular, if the micom 74 controls the first and second switches 64 and 66 at the intervals of about 3.4 ms, the coordinate value also may be outputted from the touch panel controller 70 to the system 80 at the intervals of about 3.4 ms.

At step 3S, the system 80 may calculate a variation of the inputted coordinate value. In particular, the hand-rejection processing unit 114 may compare the coordinate values reset in accordance with the Communication Protocol of the display resolution (XGA or SVGA) in the coordinate calculating unit 112, thereby calculating the variation of the two coordinate values. The variation of the coordinate values may be calculated as the X-axis and Y-axis direction ($\Delta Xn$, $\Delta Yn$).

At step 4S, the variation may be compared to a predetermined value K. In particular, the predetermined value K may be a unit of the coordinate value reset in accordance with the Communication Protocol of the display resolution, which is set by a resolution, not by a distance. Thus, in a case of a non-double touch, the variation of the coordinate values is within the predetermined K. Thus, if the variation is less than the predetermined value K, the coordinate values may be determined as being normally measured.

In addition, if the variation is greater than the predetermined value K, the processing unit 114 further may check whether such variation occurred at the initialized state (N=0) at step 10S. If the variation did not occur at the initialized state, the coordinate values may be determined as release of a double touch. Further, at step 16S, the initialized value N may be maintained as "N=0" as a flag for later displaying the inputted coordinate values at steps 12S, 5S and 8S. In addition, the X-Y variation may be stored in memory 122.

On the other hand, if the variation is greater than the predetermined value K, and such variation occurred at the initialized state, the coordinate values may be determined as a double touch at step 6S. Then, the coordinate value may be compensated at step 7S. In particular, the coordinate values may be compensated by subtracting the X-Y variation from the X and Y coordinate values. Further, at step 11S, the initialized value N may be converted to "N=1" as a flag for later displaying the compensation of the coordinate value by the double touch at step 8S. In addition, the X-Y variation may be stored in memory 122.

Figure 6:
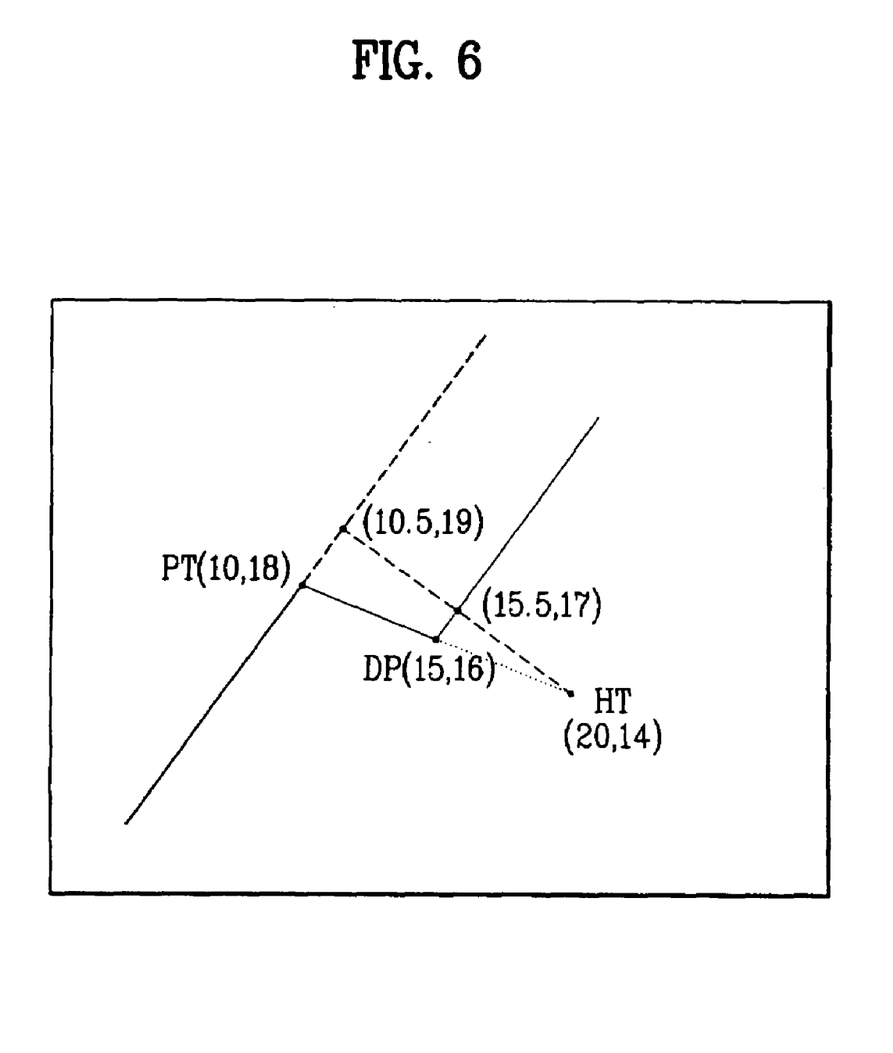
FIG. 6 is an error of a double touch when drawing a line on a touch panel device according to the present invention.

FIG. 6 is an error of a double touch when drawing a line on a touch panel device according to the present invention. In FIG. 6, a line is first drawn without double touching. However, when a pen touch point PT becomes coordinates of (10,18), and a hand touch point HT may be unintentionally created. In particular, the hand touch point HT may have coordinates of (20, 14). When the pen touch point PT and the hand touch point HT occur at the same time, the touch panel 30 may falsely output coordinates (15,16) as coordinate values, which corresponds to a middle point DP between the pen touch point PT and the hand touch point HT.

For example, the predetermined value K may be set as an absolute value of "5." At step 2S (shown in FIG. 5), the coordinates of the pen touch point PT may be inputted to the system 80 as a first coordinate value, and the coordinates of the middle point DP may be then inputted to the system 80 as a second coordinate value. At step 3S (shown in FIG. 5), a variation between the first coordinate value and the second coordinate value may be calculated. In particular, an X-axis directional variation ($\Delta X$) is "5" obtained by subtracting 10 from 15, and Y-axis directional variation ($\Delta Y$) is "−2" obtained by subtracting 18 from 16. Then, at step 4S (shown in FIG. 5), the variation may be determined to be equal to the predetermined value K. Then, the first and second coordinate values may be further confirmed as a double touch after step 10S and at step 6S (shown in FIG. 5).

Accordingly, at step 7S (shown in FIG. 5), the second coordinate value may be compensated. In particular, the X-axis directional variation and the Y-axis directional variation may be subtracted from the second coordinate value DP (15,16) as correct coordinate values. That is, the X-axis coordinate value is compensated to "10" by subtracting 5 from 15, and the Y-axis coordinate value is compensated to "18" by adding 2 to 16, thereby obtaining the correct coordinate value (10,18) being the same as the pen touch point PT. Further, the initialized value N may be converted to "N=1" at step 11S (shown in FIG. 5) as a flag for later displaying the compensation of the coordinate value by the double touch, and the compensated variation value ($\Delta X$ being "5," and $\Delta Y$ being "−2") may be stored at step 14S (shown in FIG. 5).

In addition, when the hand is touched on one portion of the touch panel, and the pen is moved on the touch panel continuously, the variation of the coordinate value is less than the predetermined value, whereby the false coordinates are displayed. In FIG. 6, if a third coordinate value (15.5,17) is inputted to the system 80, the variation $\Delta Xn$, $\Delta Yn$) between the second coordinate value and the third coordinate value is less than the predetermined value K. Thus, such a double touch would not be detected at steps 4S-10S and 6S. However, because the initialized value N has been converted to "N=1" previously, a previous occurrence of a double touch may be detected at step 12S (shown in FIG. 5). Accordingly, at step 13S (shown in FIG. 5), the third coordinate value may still be compensated with the variation (ΔX, ΔY) stored previously at step 14S (shown in FIG. 5). That is, the X-axis coordinate value is compensated to "10.5" by subtracting 5 from 15.5, and the Y-axis coordinate value is compensated to "19" by adding 2 to 17, thereby obtaining the correct coordinate value (10.5,19).

If the hand touch is released when outputting the correct coordinate value by repetitively performing the aforementioned process, the variation of the coordinate value becomes greater than the predetermined value K. That is, if the variation of the coordinate value becomes greater than the predetermined value K at step 4S in state of compensating the coordinate value (N=1), it is determined as the release of the double touch at step 15S. Thus, the value of "N" is reset to "N=0" at step 16S, and the input coordinate value is recognized as a substantial coordinate value at step 5S, and then displayed on the display at step 8S. Accordingly, a correct coordinate would not be inaccurately compensated by the aforementioned process.

In the touch panel device according to the present invention, if a user touches the surface of the touch panel with a stylus and with his hand at the same time, a double touch may be detected and corrected in a rapid time period. Thus, even though the false coordinate value may outputted according to the continuous double touch, the correct coordinate value of the stylus touching point may be displayed. In case of drawing the line, the correct line is displayed according to the pen touching point. In addition, a release of a double touch also may be detected and the inputted coordinate may be displayed.

It will be apparent to those skilled in the art that various modifications and variations can be made in the apparatus and the method for driving a touch panel of the present invention without departing from the spirit or scope of the invention. Thus, it is intended that the present invention cover the modifications and variations of this invention provided they come within the scope of the appended claims and their equivalents.

What is claimed is:

1. A method for driving a touch panel comprising:
    sequentially inputting coordinate values of touched points on the touch panel at predetermined time intervals;
    measuring a variation of the inputted coordinate values;
    determining the inputted coordinate values as a double touch when the measured variation is greater than a predetermined value; and
    compensating the inputted coordinate values if determined as a double touch.

2. The method of claim 1, wherein the step of measuring measures variation of the inputted coordinate values along an X-axis or a Y-axis direction.

3. The method of claim 1, wherein the step of compensating the inputted coordinate values is performed by subtracting the measured variation from the inputted coordinates.

4. A method for driving a touch panel comprising:
    sequentially inputting coordinate values corresponding to at least two portions touched on the touch panel at predetermined time intervals;
    measuring a variation of the inputted coordinate values;
    determining the inputted coordinate values as a double touch if the measured variation is greater than a predetermined value; and
    compensating the inputted coordinate values based on whether they are determined as a double touch.

5. The method of claim 4, wherein the step of measuring measures the variation of the input coordinate values along an X-axis or a Y-axis direction.

6. The method of claim 4, wherein the step of compensating the input coordinate values is performed by subtracting the measured variation from the inputted coordinate value.

7. A method for driving a touch panel comprising:
    sequentially inputting coordinate values corresponding to at least two portions touched on the touch panel at predetermined time intervals;
    measuring a variation of the inputted coordinate values;
    detecting whether the measured variation is greater than a predetermined value;
    detecting whether the coordinate values were compensated previously;
    compensating the inputted coordinate values when the measured variation is detected to be greater than the predetermined value, and when the coordinate values were not compensated previously;
    compensating the inputted coordinate values when the measured variation is detected not to be greater than the predetermined value, and when the coordinate values were compensated previously;
    recognizing the inputted coordinate values as substantial coordinate values when the measured variation is detected to be greater than the predetermined value, and when the coordinate values were compensated previously; and
    recognizing the inputted coordinate values as the substantial coordinate values when the measured variation is detected to be less than the predetermined value, and when the coordinate values were not compensated previously.

8. The method of claim 7, wherein the step of compensating the inputted coordinate values when the measured variation is detected not to be greater than the predetermined value, and when the coordinate values were compensated previously, is performed by subtracting the measured variation from the inputted coordinate values.

9. The method of claim 7, further comprising a step for storing the measured variation of the coordinate values, after the inputted coordinate values are compensated when the measured variation is detected to be greater than the predetermined value, and when the coordinate values were not compensated previously.

10. The method of claim 9, wherein the step for compensating the inputted coordinate values when the measured variation is detected not to be greater than the predetermined value, and when the coordinate values were compensated previously, is performed by subtracting the stored variation from the inputted coordinate values.

11. The method of claim 7, wherein the step of measuring measures the variation of the input coordinate values along an X-axis or a Y-axis direction.

* * * * *